(12) United States Patent
Shibao (10) Patent No.: US 8,838,790 B2
(45) Date of Patent: Sep. 16, 2014

(54) CONFIGURATION VALUE MANAGEMENT APPARATUS AND MANAGEMENT METHOD

(75) Inventor: Koki Shibao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 13/473,776

(22) Filed: May 17, 2012

(65) Prior Publication Data

US 2012/0324210 A1    Dec. 20, 2012

(30) Foreign Application Priority Data

Jun. 14, 2011  (JP) ................................ 2011-132709

(51) Int. Cl.
| | | |
|---|---|---|
| G06F 15/177 | (2006.01) | |
| G06F 15/173 | (2006.01) | |
| G06F 3/12 | (2006.01) | |
| H04L 12/24 | (2006.01) | |
| H04N 21/6547 | (2011.01) | |

(52) U.S. Cl.
CPC .......... H04L 41/0853 (2013.01); G06F 3/1229 (2013.01); G06F 3/1287 (2013.01); G06F 3/1204 (2013.01); H04L 41/0813 (2013.01); H04N 21/6547 (2013.01)
USPC .......................................... 709/224; 709/220

(58) Field of Classification Search
USPC .................... 709/223–224; 358/1.13, 1.15
See application file for complete search history.

(56) References Cited

U.S. PATENT DOCUMENTS

| | | | | |
|---|---|---|---|---|
| 8,612,574 B2* | 12/2013 | Akiyama et al. | ............... | 709/224 |
| 2004/0039811 A1* | 2/2004 | Nakamura et al. | ............ | 709/223 |
| 2004/0153532 A1 | 8/2004 | Hosotani et al. | ............... | 709/222 |
| 2008/0092144 A1 | 4/2008 | Nakazawa | ..................... | 718/105 |
| 2008/0144086 A1 | 6/2008 | Shibao | ......................... | 358/1.15 |
| 2009/0094604 A1* | 4/2009 | Sakai | ................. | 718/1 |
| 2009/0190150 A1* | 7/2009 | Selvaraj et al. | .............. | 358/1.13 |
| 2011/0116131 A1* | 5/2011 | Mitsui | .......................... | 358/1.15 |
| 2012/0311311 A1 | 12/2012 | Asahara | ........................... | 713/1 |

FOREIGN PATENT DOCUMENTS

| | | |
|---|---|---|
| EP | 1 191 450 A1 | 3/2002 |
| JP | 2007-130838 A | 5/2007 |
| JP | 2010-113597 A | 5/2010 |

* cited by examiner

*Primary Examiner* — Joshua Joo
(74) *Attorney, Agent, or Firm* — Fitzpatrick, Cella, Harper & Scinto (57) ABSTRACT

Virtual configuration values are generated in accordance with the model of a specified image forming apparatus using a model-based configuration value schema that defines a configuration value schema for each model of multiple image forming apparatuses and tenant configuration values in which a user has set configuration values for the multiple image forming apparatuses. In the case where a new settings item is present in the generated virtual configuration values, the new settings item is applied to settings items in the tenant configuration values.

9 Claims, 12 Drawing Sheets

| CONFIGURATION VALUE IDENTIFIER | DEFAULT VALUE | VALUE RANGE | CONDITIONS | SERVICE PERSONNEL INPUT |
|---|---|---|---|---|
| copy_settings.nup | 1 in 1 | 1 in 1, 2 in 1, 4 in 1 | NONE | NO |
| device_settings.cloud_address | "http://oanon.com/config" | 256 BYTES | NONE | NO |
| device_settings.sleep_time | 10 MINUTES | 1 MINUTE, 10 MINUTES, 1 HOUR | NONE | NO |
| fax_settings.received_print | OFF | ON, OFF | FAX UNIT | NO |
| box_settings.server_address | " " | 256 BYTES | NONE | NO |

| CONFIGURATION VALUE IDENTIFIER | DEFAULT VALUE | VALUE RANGE | CONDITIONS | SERVICE PERSONNEL INPUT |
|---|---|---|---|---|
| copy_settings.nup | 1 in 1 | 1 in 1, 2 in 1, 4 in 1 | NONE | NO |
| device_settings.sleep_time | 10 SECONDS | 10 SECONDS, 1 MINUTE, 10 MINUTES, 1 HOUR | NONE | NO |
| fax_settings.received_print | OFF | ON, OFF | FAX UNIT | NO |
| new_setting1 | OFF | ON, OFF | NONE | YES |
| new_setting2 | OFF | ON, OFF | NONE | NO |

| CONFIGURATION VALUE IDENTIFIER | VALUE | SERVICE PERSONNEL INPUT |
|---|---|---|
| copy_settings.nup | 2 in 1 | NO |
| device_settings.sleep_time | 10 SECONDS | NO |
| fax_settings.received_print | ON | NO |
| box_settings.server_address | "http://192.168.1.1/server/" | NO |

FIG. 5B

| CONFIGURATION VALUE IDENTIFIER | VALUE | SERVICE PERSONNEL INPUT |
|---|---|---|
| copy_settings.nup | 2 in 1 | NO |
| device_settings.sleep_time | 10 SECONDS | NO |
| fax_settings.received_print | ON | NO |
| box_settings.server_address | "http://192.168.1.1/server/" | NO |
| new_setting1 | OFF | YES |
| new_setting2 | OFF | NO |

FIG. 6A

| DATA TYPE | VALUE |
|---|---|
| MODEL CODE | 0x01 |
| FIRMWARE VERSION | 00.01 |
| DEVICE IDENTIFIER | 010001 |
| FAX UNIT | NONE |

FIG. 6B

| DATA TYPE | VALUE |
|---|---|
| MODEL CODE | 0x01 |
| FIRMWARE VERSION | 00.01 |
| DEVICE IDENTIFIER | 010002 |
| FAX UNIT | PRESENT |

FIG. 6C

| DATA TYPE | VALUE |
|---|---|
| MODEL CODE | 0x02 |
| FIRMWARE VERSION | 01.00 |
| DEVICE IDENTIFIER | 020001 |
| FAX UNIT | PRESENT |

FIG. 7A

| CONFIGURATION VALUE IDENTIFIER | VALUE |
|---|---|
| copy_settings.nup | 2 in 1 |
| device_settings.cloud_address | "http://oanon.com/config" |
| device_settings.sleep_time | 10 MINUTES |
| fax_settings.received_print | OFF |
| box_settings.server_address | "http://192.168.1.1/server/" |

FIG. 7B

| CONFIGURATION VALUE IDENTIFIER | VALUE |
|---|---|
| copy_settings.nup | 2 in 1 |
| device_settings.cloud_address | "http://oanon.com/config" |
| device_settings.sleep_time | 10 MINUTES |
| fax_settings.received_print | ON |
| box_settings.server_address | "http://192.168.1.1/server/" |

FIG. 7C

| CONFIGURATION VALUE IDENTIFIER | VALUE |
|---|---|
| copy_settings.nup | 2 in 1 |
| device_settings.sleep_time | 10 SECONDS |
| fax_settings.received_print | ON |
| new_setting1 | OFF |
| new_setting2 | OFF |

FIG. 8

| DEVICE IDENTIFIER | TENANT IDENTIFIER | VIRTUAL DEVICE CONFIGURATION DATA | VIRTUAL CONFIG DATA | NOTIFICATION FLAG |
|---|---|---|---|---|
| 010001 | 100 | 1 | 1 | INCOMPLETE |
| 010002 | 100 | 2 | 2 | INCOMPLETE |
| 020001 | 100 | 3 | 3 | COMPLETED |
| 010010 | 200 | 4 | 4 | COMPLETED |

CONFIGURATION VALUE MANAGEMENT APPARATUS AND MANAGEMENT METHOD

BACKGROUND OF THE INVENTION

1. Field of the Invention

The present invention relates to techniques for collectively managing configuration values (config data) for switching operations of an image forming apparatus.

2. Description of the Related Art

There are conventional image forming apparatuses that store configuration values (config data) for switching the operations of the image forming apparatuses. Because config data is stored in storage units provided in the respective individual image forming apparatuses, it is necessary to make configurations for each image forming apparatus when changing the config data of all of the image forming apparatuses.

There is a technique in which such config data is collectively configured in multiple image forming apparatuses by a given information processing apparatus in order to eliminate this burden. In addition, there is a technique in which config data is managed collectively by placing config data in a network-accessible location, and allowing multiple image forming apparatuses to access the config data (Japanese Patent Laid-Open No. 2007-130838).

However, although the aforementioned techniques that enable config data to be managed collectively have been provided, the following problems occur. In the case where new functions have been added as a part of new models, there will be settings items for which past config data is not present, and thus the new devices will be unable to be managed using the config data that is being collectively managed.

Although a technique for registering new items does exist in a user management system (Japanese Patent Laid-Open No. 2010-113597), this system lacks a technique for managing config data collectively.

SUMMARY OF THE INVENTION

The present invention provides an apparatus and method capable of applying new settings items to config data without conflicts even in the case where new functions have been developed as part of new models and settings items not present in past configuration values (config data) are added.

According to an aspect of the present invention, there is provided a configuration value management apparatus that collectively manages configuration values of multiple image forming apparatuses, the configuration value management apparatus comprising: a generating unit that generates virtual configuration values in accordance with the model of a specified image forming apparatus using a model-based configuration value schema that defines a configuration value schema for each model of the multiple image forming apparatuses and tenant configuration values in which a user has set configuration values for the multiple image forming apparatuses; an applying unit that, in the case where a new settings item is present in the virtual configuration values generated by the generating unit, applies the new settings item to settings items in the tenant configuration values; and a managing unit that holds and manages the virtual configuration values generated by the generating unit.

Further features of the present invention will become apparent from the following description of exemplary embodiments with reference to the attached drawings.

DESCRIPTION OF THE EMBODIMENTS

An embodiment for carrying out the invention will be described in detail hereinafter with reference to the drawings.

First, terms used in the following embodiment will be defined. "Configuration values (config data)" refers to data for switching operations of an image forming apparatus. This corresponds to, for example, the default values for the layout of a copy job. With a setting of "1 in 1", when a copy is made, a single page is printed on a single sheet of paper. On the other hand, with a setting of "2 in 1", when a copy is made, two pages are printed on a single sheet of paper.

"Device configuration data" refers to data indicating the configuration of a device provided in the image forming apparatus. This is, for example, data indicating whether a fax unit is provided. This data furthermore includes a model code for uniquely identifying the model of the image forming apparatus, the version of the firmware running on the apparatus, and so on.

"Model-based configuration value schema" refers to data that defines a schema for config data held by specific models of image forming apparatuses. "Schema", meanwhile, refers to data that define protocols, positioning, and so on of config data. For example, configuration value identifiers, default values, value ranges, conditions under which data is valid, and so on for each instance of config data are included in the model-based configuration value schema. Note that there are differences in the config data held depending on the model, and it is assumed that configuration value schema are prepared and utilized on a model-by-model basis.

A "virtual device" is a group of data of real devices held by a server computer group. Specifically, this includes at least device configuration data and config data.

"Tenant" refers to the unit of assignees to which a user assigns the management of the image forming apparatuses. Meanwhile, "tenant identifier" refers an identifier for uniquely identifying a tenant. Assume, for example, that a given company assigns the management of three image forming apparatuses in a user environment to a tenant. In this case, a single tenant identifier corresponding to the user environment is allocated; as a result, the three image forming apparatuses are recognized as image forming apparatuses that belong to that tenant, and are thus managed collectively.

Here, the following definitions are provided in order to differentiate between data included in a virtual device, data held by a real device, and dedicated tenant data. The device configuration data contained in a virtual device is called "virtual device configuration data", and the configuration values (config data) of a virtual device are called "virtual configuration values (virtual config data)". The device configuration data held by a real device is called "real device configuration data", and the configuration values (config data) of a real device are called "real configuration values (real config data)". Configuration values (config data) to be shared within a tenant are called "tenant configuration values (tenant config data)". Other terms not defined here will be described as appropriate.

Next, an example of a network configuration for multiple image forming apparatuses will be described using FIG. 1. Image forming apparatuses 101 (101A through 101C) are managed collectively by a configuration value management service 310, which will be described later, and are each capable of accessing the Internet 104 via a network 106.

A terminal apparatus 102A is a computer that can be operated by a user in a user environment 100, and is capable of accessing the Internet 104 via the network 106. Meanwhile, a terminal apparatus 102B is a computer that can be operated by service personnel that manages the image forming apparatuses 101, and is capable of accessing the Internet 104. Furthermore, a terminal apparatus 102C is a computer that can be operated by an administrator that belongs to the vendor of the image forming apparatuses 101, and is capable of accessing the Internet 104. The Internet 104 is a computer network that connects the apparatuses using Internet protocol techniques.

A server computer group 105 is a server group that provides multiple services over the Internet 104. The network 106 is a network capable of digital communication within the user environment 100. A service personnel environment 110 is an environment for service personnel to manage the image forming apparatuses using the terminal apparatus 102B. A vendor environment 120 for the image forming apparatuses is an environment in which an administrator working for the vendor that manufactures the image forming apparatuses uses the terminal apparatus 102C to carry out maintenance on data necessary for administering the image forming apparatuses.

Here, examples of the hardware configurations of the image forming apparatuses 101, the terminal apparatuses 102, and the server computer group 105 will be described using FIG. 2. First, a CPU 211 of the image forming apparatuses 101 executes programs, controls various processes, and so on. A non-volatile memory 212 is configured of a ROM, and stores programs, data, and so on required in the initial stages of a startup process for the apparatus. A volatile memory 213 is configured of a RAM, and is used as a temporary storage location for programs and data. An auxiliary storage unit 214 is configured of a high-capacity storage unit such as a hard disk, a RAM drive, or the like, and holds large volumes of data, execution codes for programs, and so on. This auxiliary storage unit stores data that is required to be held for longer periods of time than the data stored in the volatile memory 213. Because the auxiliary storage unit 214 is a non-volatile storage unit, the data stored therein continues to be stored even if the power thereto is cut off.

A display 215 is a device used to communicate information to a user. The term "user" here is assumed to include both normal users and service personnel. An input device 216 is a device for accepting selection instructions from the user and communicating those instructions to programs via an internal bus 210. A network communication device 217 is a device for communicating with another information processing apparatus over a network. A fax unit 218 is a hardware unit for sending, over the network 106 to another information device, image data formed by the image forming apparatus 101 or image data stored in the auxiliary storage unit. The fax unit 218 is optional, and may not be provided depending on the apparatus.

A printer engine 219 has a function for printing, onto a paper medium, image data formed by the image forming apparatus 101 or image data stored in the auxiliary storage unit. The internal bus 210 is a communication bus that connects the CPU 211, the non-volatile memory 212, the volatile memory 213, the auxiliary storage unit 214, the display 215, the input device 216, and the network communication device 217 in a communicable state within the image forming apparatus 101.

The server computer group 105 is configured of multiple server computers 205 and 206 that are connected over a network 260. An internal bus 250 is a communication bus that connects a CPU 251, a non-volatile memory 252, a volatile memory 253, an auxiliary storage unit 254, and a network communication device 257, which are provided in the server computer 205, in a communicable state within the server computer 205. The network 260 is a network that enables the server computers of which the server computer group 105 is configured to communicate at high speeds.

Note that the hardware configuration of the terminal apparatuses 102 is the same as the hardware configuration of the image forming apparatuses 101, with the exception of the fax unit 218 and the printer engine 219; therefore, descriptions thereof will be omitted.

Next, an example of the software configuration of the configuration value management service 310 executed by one of the server computers in the server computer group 105, and an example of the software configuration of the image forming apparatuses 101, will be described using FIG. 3.

First, the software configuration of the image forming apparatuses 101 will be described. A real config data holding unit 301 holds config data of the image forming apparatuses 101 in the auxiliary storage unit 214, and the image forming apparatuses 101 switch their operational behavior based on the real config data that is held. A real config data updating unit 302 updates the real config data held by the real config data holding unit 301. The real config data is updated using virtual config data received by a virtual config data receiving unit 303, which will be mentioned later. Meanwhile, updating of the real config data is limited to cases where the virtual config data has been updated by a virtual config data update confirmation unit 322, which will be mentioned later.

The virtual config data receiving unit 303 calls a virtual config data obtaining unit 320, mentioned later, and receives the virtual config data. An address held in the real config data holding unit 301 is used as the address for calling the virtual config data obtaining unit 320. Specifically, to use the example illustrated in FIG. 7A, an address "http://canon.com/config", serving as a value 703 whose configuration value identifier 702 is "device_settings.cloud_address", is accessed.

Figure 6A:
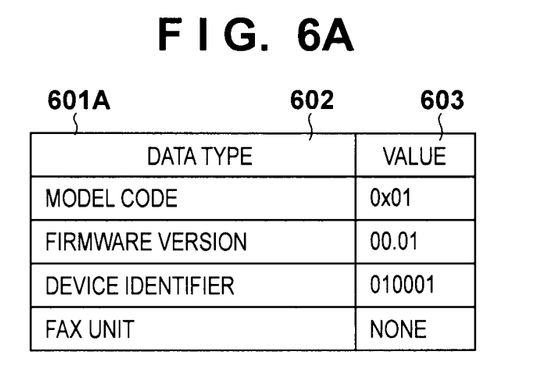
FIG. 6A through FIG. 6C are diagrams illustrating an example of real device configuration data.
Figure 6B:
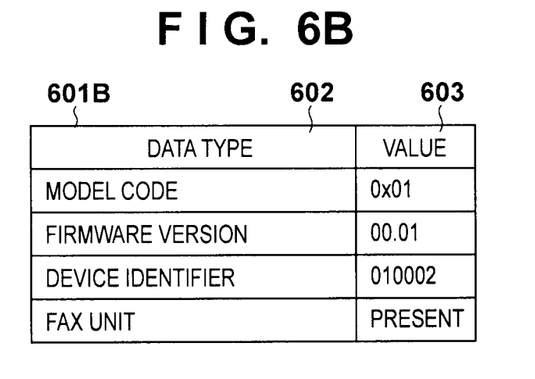
Figure 6C:
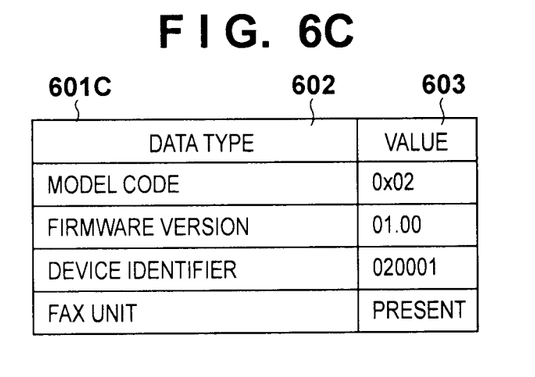

A real device configuration data collection unit 304 collects the device configuration data of the image forming apparatuses 101. FIG. 6A through FIG. 6C are diagrams illustrating an example of real device configuration data. Values 603 are stored for respective data types 602. Model codes for identifying models, firmware versions, device identifiers for identifying devices, the presence/absence of a fax unit, and so on can be given as examples.

A tenant identifier holding unit 305 stores tenant identifiers for tenants to which the image forming apparatuses 101 belong. These tenant identifiers are configured when the image forming apparatuses 101 are first installed, and are stored in the auxiliary storage unit 214 so that the identifiers are not lost even if the power is turned off. A real device configuration data notification unit 306 communicates the real device configuration data collected by the real device configuration data collection unit 304 along with the tenant identifiers stored in the tenant identifier holding unit 305. These items are communicated to a real device configuration data receiving unit 318, which will be mentioned later.

Next, the software configuration of the configuration value management service 310 will be described. The configuration value management service 310 is a service that provides a function for collectively managing the configuration values (config data) of the multiple image forming apparatuses 101A through 101C. The configuration value management service 310 is provided through the server computer group 105 described above, and holds multiple units. These units will be described hereinafter.

Figure 8:
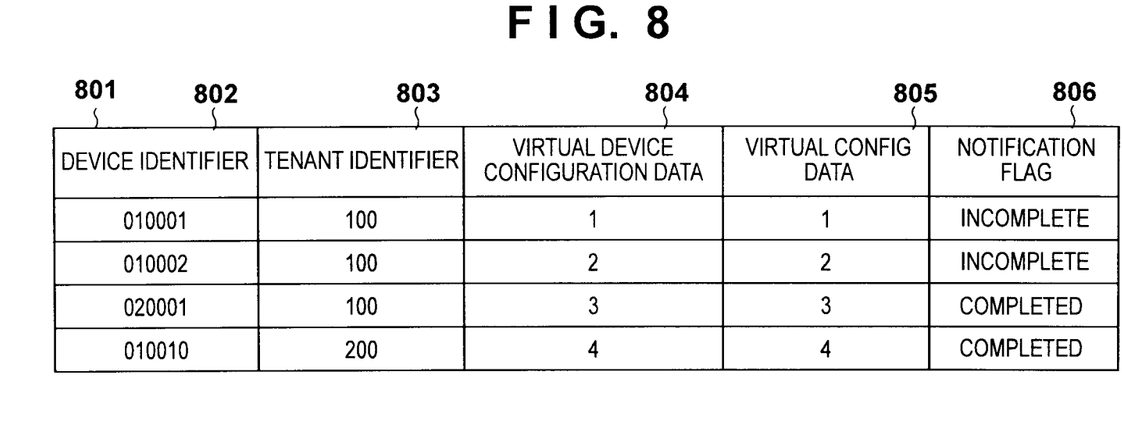
FIG. 8 is a diagram illustrating an example of the configuration of a virtual device holding unit.

A virtual device holding unit 311 stores data held by virtual devices. FIG. 8 illustrates an example of virtual devices held by the virtual device holding unit 311. A virtual device list 801 represents all the virtual devices held by the virtual device holding unit 311.

A device identifier 802 is an identifier for specifying a single virtual device from among the multiple virtual devices in the virtual device list 801. The device identifier 802 is an identifier that is originally stored in the image forming apparatus 101, and is an identifier that can uniquely identify the image forming apparatus 101. This identifier is communicated by the image forming apparatus 101 as a piece of the device configuration data.

A tenant identifier 803 is an identifier for specifying the tenant to which the image forming apparatus 101 that corresponds to the virtual device belongs. Virtual device configuration data 804 is device configuration data for the image forming apparatus 101 that corresponds to the virtual device. The information illustrated in FIG. 6A through FIG. 6C is held separately by the virtual device holding unit 311 as the virtual device configuration data. An identifier that serves as a reference to the information shown in FIG. 6A through FIG. 6C is held in the virtual device configuration data 804.

Figure 7A:
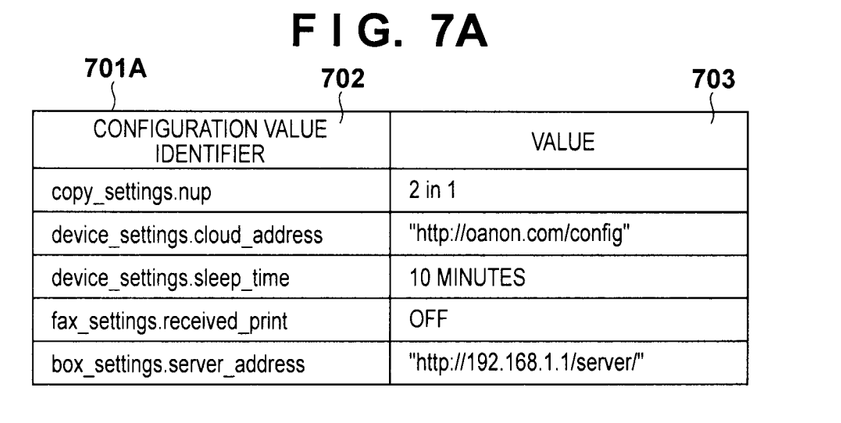
FIG. 7A through FIG. 7C are diagrams illustrating examples of the configuration of a real config data holding unit.
Figure 7B:
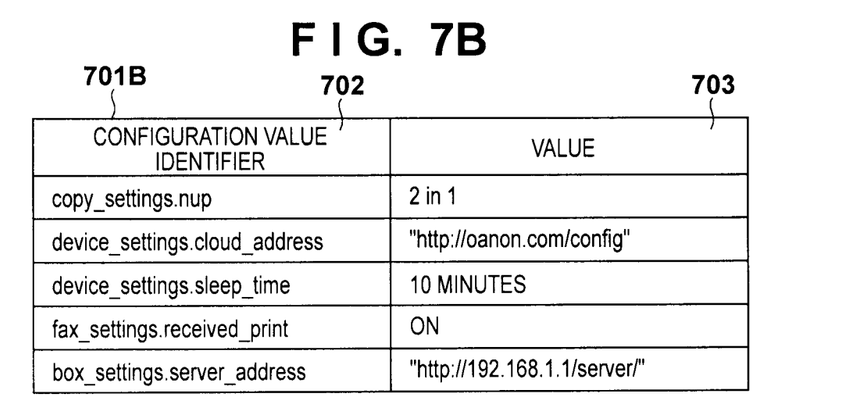
Figure 7C:
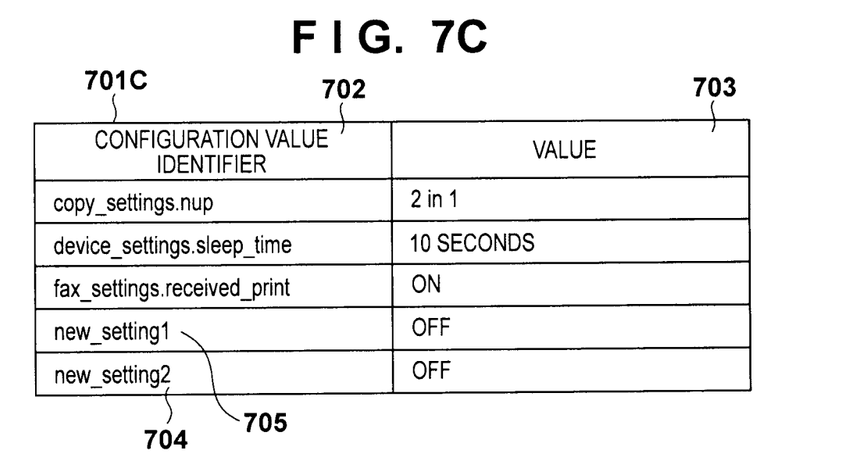

Virtual config data 805 is config data to be referred to by the image forming apparatus 101 that corresponds to the virtual device. The information illustrated in FIG. 7A through FIG. 7C is held separately by the virtual device holding unit 311 as the virtual config data. An identifier that serves as a reference to the information shown in FIG. 7A through FIG. 7C is held in the virtual config data 805.

A notification flag 806 is a flag indicating whether the image forming apparatus 101 has been notified after the virtual config data has been updated. When the corresponding virtual config data is referred to by the virtual config data obtaining unit 320, the flag is set to "completed". When the corresponding virtual config data is updated by a virtual config data updating unit 317, however, the flag is set to "incomplete".

A model-based configuration value schema holding unit 312 stores the model-based configuration value schema. A single model-based configuration value schema is prepared in correspondence for each model of the image forming apparatuses 101. Examples of the model-based configuration value schema are shown in FIG. 4A and FIG. 4B. FIG. 4A is an example of a model-based configuration value schema whose model code is 0x01. FIG. 4B, meanwhile, is an example of a model-based configuration value schema whose model code is 0x02.

A configuration value identifier 402 is an identifier for uniquely identifying a configuration value. Here, "copy_settings.nup" indicates a setting regarding layout in the copy settings. An identical configuration value identifier 402 indicates a configuration value that is the same type even for different models.

A default value 403 defines the default configuration value for that model. A value range 404 defines a range that can be set for that model. If the value range 404 is "copy_settings.nup", three types, or "1 in 1", "2 in 1", and "4 in 1" can be selected.

A condition 405 defines a condition for using the configuration value in that model. Because the condition 405 for "fax_settings.received_print" includes "fax unit", that configuration value is valid only in the case where a fax unit is provided.

Meanwhile, service personnel input 406 indicates a flag for instructing whether or not it is necessary for service personnel to input the default value. Note, however, that if it is not particularly necessary for service personnel to input values for any of the configuration values, this flag may be omitted.

A model-based configuration value schema updating unit 313 updates the model-based configuration value schema held by the model-based configuration value schema holding unit 312. In the case where an image forming apparatus vendor has announced a new model, a model-based configuration value schema corresponding to the new model is registered under the instructions of a director that works for the vendor. In this case, there are situations where settings items 407 and 408 are newly added as a result of new functions being added, as shown in FIG. 4B. Furthermore, in the case where the configuration values have been changed, the model-based configuration value schema is updated as well.

Figure 4A:
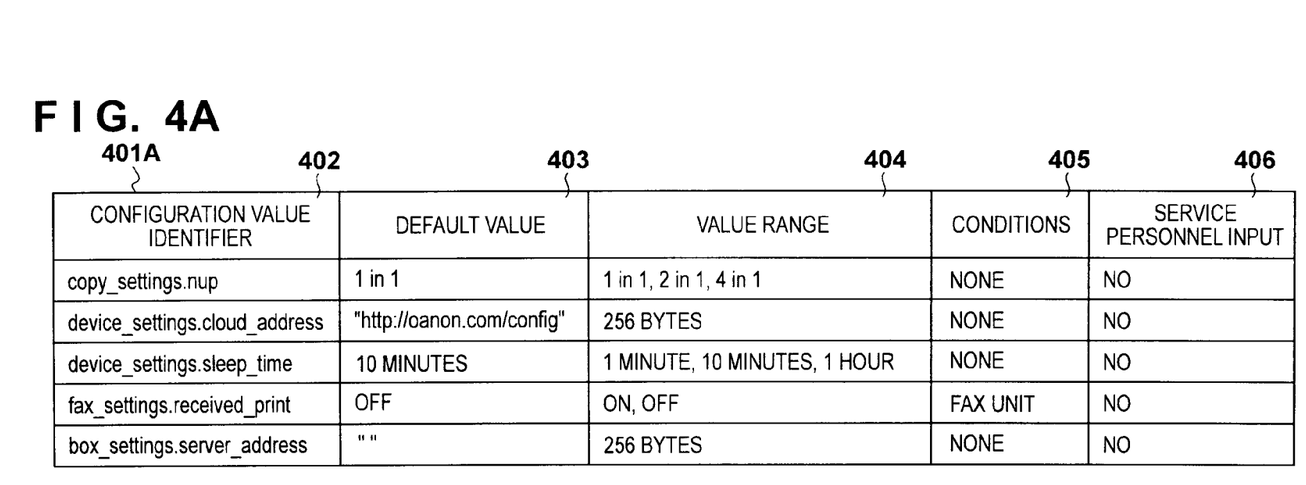
FIG. 4A and FIG. 4B are diagrams illustrating examples of model-based configuration value schema.
Figure 4B:
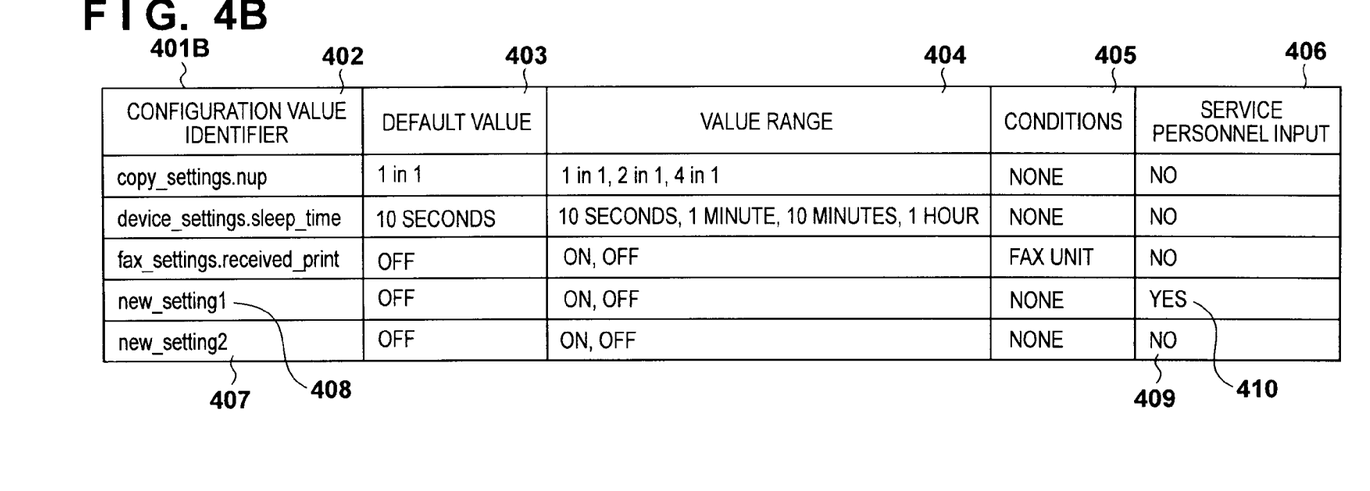
Figure 5A:
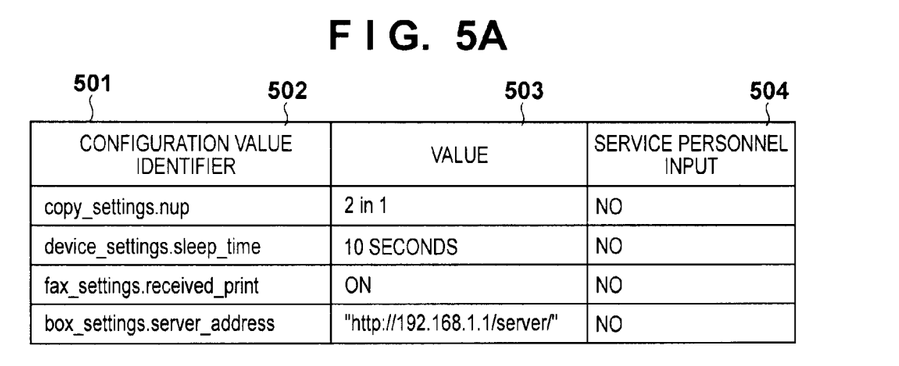
FIG. 5A and FIG. 5B are diagrams illustrating examples of tenant config data.
Figure 5B:
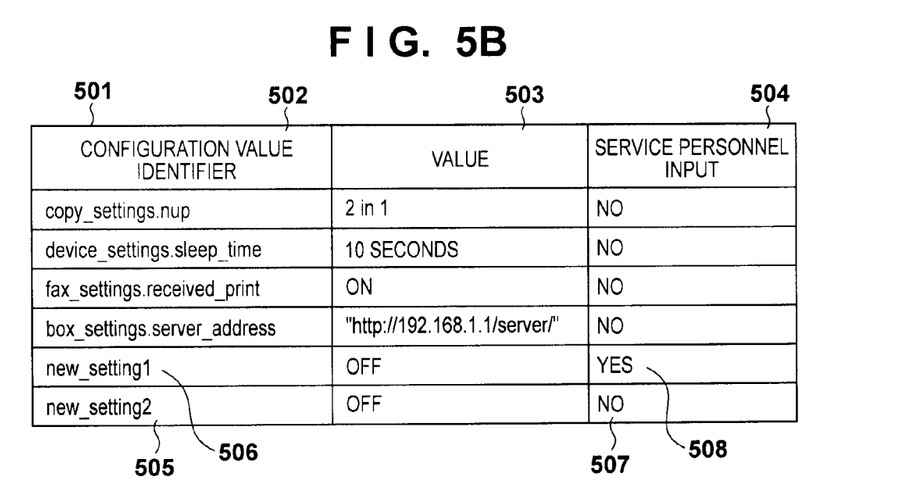

A tenant config data holding unit 314 holds the config data to be configured in the image forming apparatus 101 held by the tenant. FIG. 5A and FIG. 5B illustrate examples of the tenant config data. A configuration value identifier 502 is the same as the configuration value identifier 402 in the model-based configuration value schema illustrated in FIG. 4A and FIG. 4B. A value 503 is a value for a common setting desired by the tenant. "2 in 1" is set in "copy_settings.nup". This indicates that the tenant wishes for "2 in 1" to be set in all of the image forming apparatuses held by that tenant.

A tenant config data updating unit 315 updates the tenant config data held by the tenant config data holding unit 314. The service personnel managing the image forming apparatus held by the tenant updates the tenant config data. An update instruction is made through a settings screen displayed in a web browser run on the terminal apparatus 102B in the service personnel environment 110.

A virtual config data generation unit 316 generates the virtual config data using the model-based configuration value schema, the tenant config data, and the virtual device configuration data. The details of this process will be described on a step-by-step basis.

First, the virtual config data generation unit 316 obtains the virtual device configuration data from the virtual device holding unit 311. The virtual config data generation unit refers to the model code contained in the obtained virtual device configuration data, and specifies the model of the image forming apparatus. To use FIG. 6A as an example, a model whose model code is 0x01 is specified here.

Next, the virtual config data generation unit obtains the model-based configuration value schema that matches the obtained model code from the configuration value schema holding unit 312. Again, to use FIG. 6A as an example, the schema shown in FIG. 4A, which matches the model code of 0x01, is obtained.

Next, the configuration values defined in the model-based configuration value schema are taken as the base of the virtual config data. To use FIG. 4A as an example, the following five configuration values serve as the base: "copy_settings.nup"; "device_settings.cloud_address"; "device_settings.sleep_time"; "fax_settings.received_print"; and "box_settings.server_address".

Next, the values registered in the tenant config data are obtained, and it is determined whether or not the values fit within the value ranges defined in the model-based configuration value schema. To use FIG. 4A and FIG. 5A as examples, "copy_settings.nup" is "2 in 1", and because the value range is "1 in 1, 2 in 1, 4 in 1", the value fits within the value range. However, "device_settings.sleep_time" is "10 seconds", and because the value range is "1 minute, 10 minutes, 1 hour", the value does not fit within the value range. In the case where the value does not fit within the value range, the default value defined in the model-based configuration value schema is obtained. This is "10 minutes" in this example.

Next, it is determined whether or not the conditions defined in the model-based configuration value schema are met. This determination is carried out using the device configuration data. To use FIG. 6A as an example, there are no particular conditions for "copy_settings.nup", and thus the conditions for "copy_settings.nup" are determined to be met. However, because the condition for "fax_settings.received_print" is "fax unit", and the corresponding device configuration data is "none", the condition is not met. In the case where the conditions are met, the values determined in the steps carried out up to that point are used. However, in the case where the conditions are not met, the default values 403 defined in the model-based configuration value schema are obtained. This is "OFF" in this example.

Here, in the case where settings items that are present in the model-based configuration value schema but are not present in the tenant config data (407 and 408 in FIG. 5B) have been detected, as indicated by the combination of FIG. 4B and FIG. 5A, the new settings items are reflected in the tenant config data. This corresponds to a situation in which a new device that has new settings items has been added. FIG. 5B illustrates an example in which the new settings items have been reflected in the tenant config data.

At the same time, the new settings items are applied in the virtual config data as well. Although it is normally acceptable to set new settings items in the default values 403, it is necessary for service personnel to set the values in the case where the flag prompting input on the part of service personnel is valid (that is, when service personnel input is YES 410). A configuration value identifier that has been added, as shown in FIG. 5B, is then referred to when subsequently creating the virtual config data. Accordingly, the values 503 within the tenant config data to which new settings items have been added as shown in FIG. 5B are also applied in the case where a model for which it is necessary to use the model-based configuration value schema shown in FIG. 4B has been introduced.

The values determined through the aforementioned steps correspond to the virtual config data. FIG. 7A through FIG. 7C illustrate examples of the virtual config data. FIG. 7A indicates virtual config data corresponding to an image forming apparatus whose device identifier is 010001. FIG. 7B, meanwhile, indicates virtual config data corresponding to an image forming apparatus whose device identifier is 010002. Finally, FIG. 7C indicates virtual config data corresponding to an image forming apparatus whose device identifier is 020001.

As described above, in the case where a model that uses the model-based configuration value schema shown in FIG. 4B is newly introduced, the tenant config data is extended as indicated in FIG. 5B. At the same time, as shown in FIG. 7C, virtual config data to which new settings items 704 and 705 have been added is generated.

Here, returning to FIG. 3, the virtual config data updating unit 317 registers the virtual config data generated by the virtual config data generation unit 316 in the virtual device holding unit 311. Of the virtual devices held by the virtual device holding unit 311, the virtual device that matches the device identifier is searched out, and the virtual config data is updated. Furthermore, if the notification flag 806 of the virtual device is "completed", the flag is set to "incomplete". This indicates that the virtual config data has been changed and that it is necessary for the image forming apparatus to refer to the new virtual config data.

The real device configuration data receiving unit 318 receives a notification from the real device configuration data notification unit 306. The information of which the unit is notified is the device configuration data indicated in FIG. 6A through FIG. 6C and the tenant identifier. A virtual device configuration data updating unit 319 registers the device configuration data received by the real device configuration data receiving unit 318 as the virtual device configuration data in the corresponding virtual device. Of the virtual devices held by the virtual device holding unit 311, the virtual device that matches the device identifier is searched out, and the virtual device configuration data is updated.

The virtual config data obtaining unit 320 receives a request from the image forming apparatus 101 over the Internet 104, and obtains the virtual config data. The "request" referred to here includes at least the device identifier for specifying the virtual device, and thus the virtual device that matches the device identifier is searched out. The virtual config data held by the virtual device that has been searched out is obtained, and that virtual config data is then returned to the source of the request.

A virtual config data browsing unit 321 is a unit for browsing the virtual config data upon receiving a request over the Internet 104. The request is made using the HTTP protocol, and the virtual config data is browsed on an HTML page generated by the virtual config data browsing unit 321.

The virtual config data update confirmation unit 322 is a unit for confirming whether the virtual config data has been updated. The virtual config data receiving unit 303 sends the device identifier to the virtual config data update confirmation unit 322 over the Internet 104. The virtual config data update confirmation unit 322 searches out the virtual device that matches the received device identifier, from among the virtual devices held by the virtual device holding unit 311. If the notification flag 806 of the virtual device that has been searched out is "incomplete", it is determined that the virtual config data has been updated. Conversely, if the notification flag 806 is "completed", it is determined that the virtual config data has not been updated.

Figure 9:
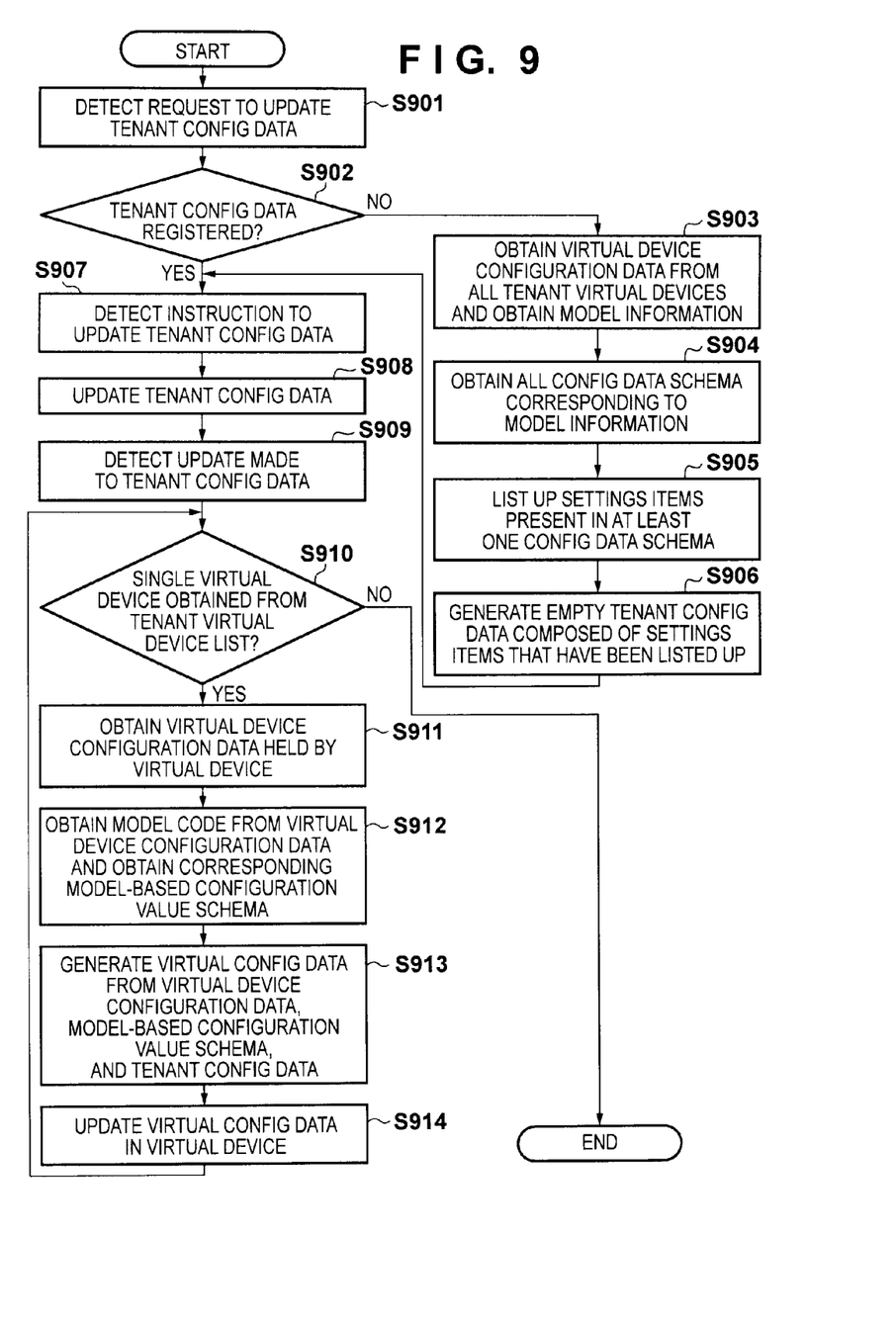
FIG. 9 is a flowchart illustrating a process for updating tenant config data.

FIG. 9 is a flowchart illustrating a process by which an administrator updates the tenant config data using the terminal apparatus 102A. The respective units that execute the steps of the flowchart are stored in the non-volatile memory 252, the volatile memory 253, or the auxiliary storage unit 254, and are executed by the CPU 251.

In S901, the tenant config data updating unit 315 detects a request to update the tenant config data. In S902, the tenant config data updating unit 315 confirms whether or not the tenant config data for which the update request was made in S901 is present in the tenant config data holding unit 314. In the case where the tenant config data is present, S907 is executed. However, in the case where the tenant config data is not present, S903 is executed.

In S903, the tenant config data updating unit 315 searches out the virtual device held by the tenant from the virtual device holding unit 311. In S904, the tenant config data updating unit 315 refers to the model code in the virtual device configuration data of the virtual device searched out in S903. Furthermore, the tenant config data updating unit searches out the model-based configuration value schema that matches the model code from the configuration value schema holding unit 312.

In S905, the tenant config data updating unit 315 lists up at least one of the settings in the model-based configuration value schema searched out in S904. In S906, the tenant config data updating unit 315 generates tenant config data having the settings listed up in S905.

In S907, the tenant config data updating unit 315 detects a specific instruction to update the tenant config data. In S908, the tenant config data updating unit 315 updates the tenant config data held by the tenant config data holding unit 314 based on the update instruction detected in S907. Then, in S909, the virtual config data generation unit 316 detects the update made to the tenant config data.

In S910, the virtual config data generation unit 316 searches out the virtual devices that match the tenant identifier in the tenant config data whose update was detected, from among the virtual devices held by the virtual device holding unit 311. Because the processing is carried out sequentially on the virtual devices that have been searched out, a single virtual device is obtained. Once the virtual device has been obtained, S911 is executed. When the processing has been carried out on all of the virtual devices in succession, there is no next virtual device to be obtained, and thus the process ends.

In S911, the virtual config data generation unit 316 obtains the virtual device configuration data from the virtual device. In S912, the virtual config data generation unit 316 obtains the model code from the virtual device configuration data. Furthermore, the virtual config data generation unit searches out the model-based configuration value schema that corresponds to the model code from the model-based configuration value schema held by the configuration value schema holding unit 312.

In S913, the virtual config data generation unit 316 generates the virtual config data using the virtual device configuration data, the model-based configuration value schema, and the tenant config data.

Figure 11:
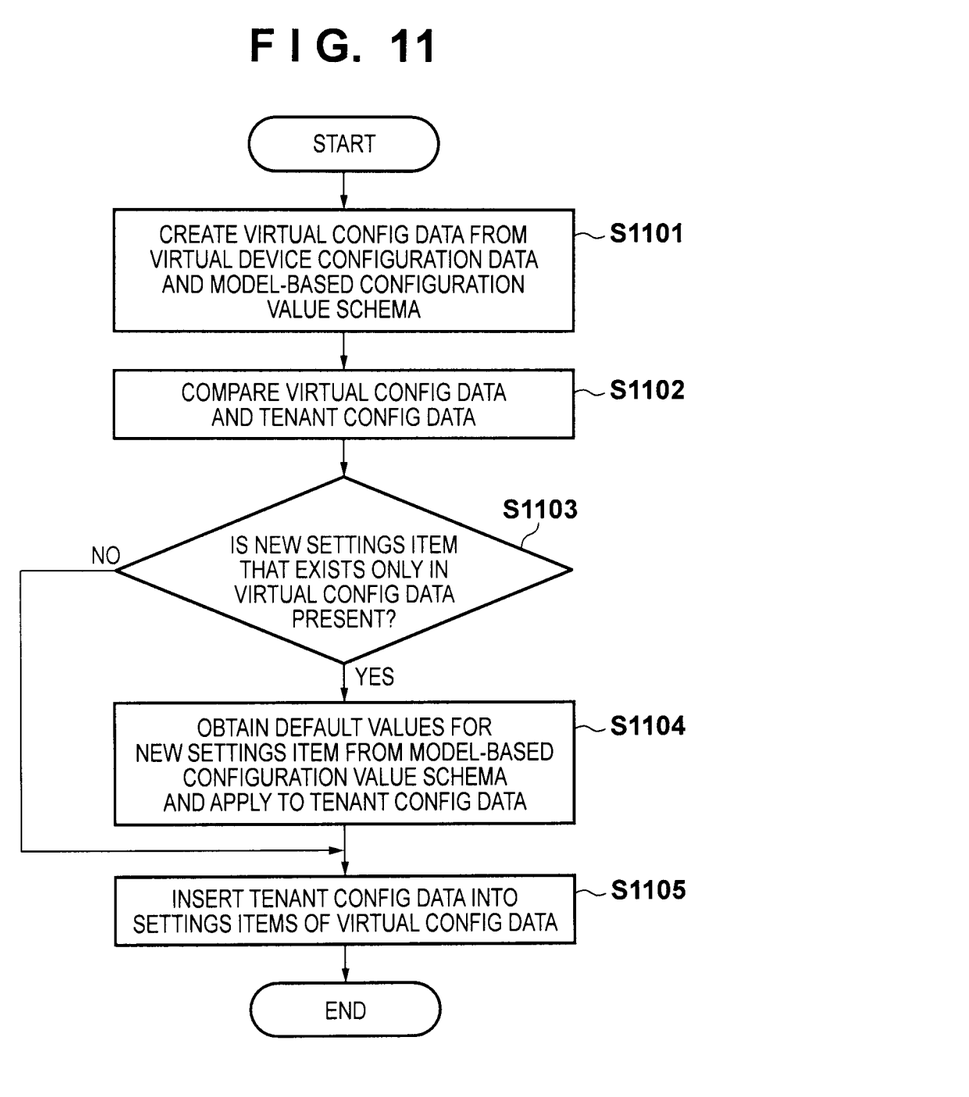
FIG. 11 is a flowchart illustrating details of a process for generating virtual config data.

Here, details of a procedure by which the virtual config data generation unit 316 generates the virtual config data will be given using FIG. 11. It is assumed here that a new model with the device identifier 020001 has already been registered. In addition, the virtual device configuration data of the newly-introduced device is assumed to be that shown in FIG. 6C. The model-based configuration value schema corresponding to this devices is assumed to be that shown in FIG. 4B. In addition, at this point in time, the tenant config data is assumed to be that shown in FIG. 5A. In other words, it is assumed that the settings items 407 and 408 newly added for the device identifier 020001 do not have any information in the tenant config data.

First, in S1101, the virtual config data generation unit 316 generates the virtual config data from the virtual device configuration data and the model-based configuration value schema. In this example, the virtual config data illustrated in FIG. 7C is created. However, at this point in time, only the settings item 702 is created, and the values 703 are not generated.

Next, in S1102, the virtual config data generation unit 316 compares the settings items in the tenant config data (FIG. 5A) with the settings items in the virtual config data (FIG. 7C). Then, in S1103, the virtual config data generation unit 316 determines whether or not a new settings item is present only in the virtual config data. In the case where the determination indicates that there is a settings item present only in the virtual config data, the process moves to S1104. In this example, the settings items 704 and 705 in FIG. 7C are present only in the virtual config data.

In S1104, the virtual config data generation unit 316 causes the settings items 704 and 705 that are not present in the tenant config data (FIG. 5A) and are only preset in the virtual config data (FIG. 7C) to be reflected in the tenant config data. As a result, as shown in FIG. 5B, settings items 505 and 506 are added to the tenant config data.

Here, the default value 403 and the service personnel input 406 in the model-based configuration value schema (FIG. 4B) are substituted for the new settings items 505 and 506 in the tenant config data (FIG. 5B). Note that as shown in FIG. 5B, in the case where the flag substituted in the service personnel input 504 is YES 508, the tenant config data updating unit 315 allows the value to be inputted by service personnel. However, the service personnel input is not limited to the timing shown in the flowchart in FIG. 11. For example, this input may be carried out when a system administrator links the tenant config data and the virtual device. Alternatively, the input may be carried out when a new model is added (when a model-based configuration value schema is added). Furthermore, a method in which the updating is carried out through a user interface (UI) screen on the newly-installed device rather than through a dedicated terminal can be considered as an input method as well.

Next, in S1105, the virtual config data generation unit 316 creates the configuration values 703 of the virtual config data (FIG. 7C) from the tenant config data (here, FIG. 5B) as the configuration values in the respective settings items in the tenant config data. The specific method for generating the virtual config data carried out in S913 of FIG. 9 is completed through the aforementioned processing.

Here, returning to FIG. 9, in S914, the virtual config data updating unit 317 registers the virtual config data generated in S913 in the virtual device.

Figure 10A:
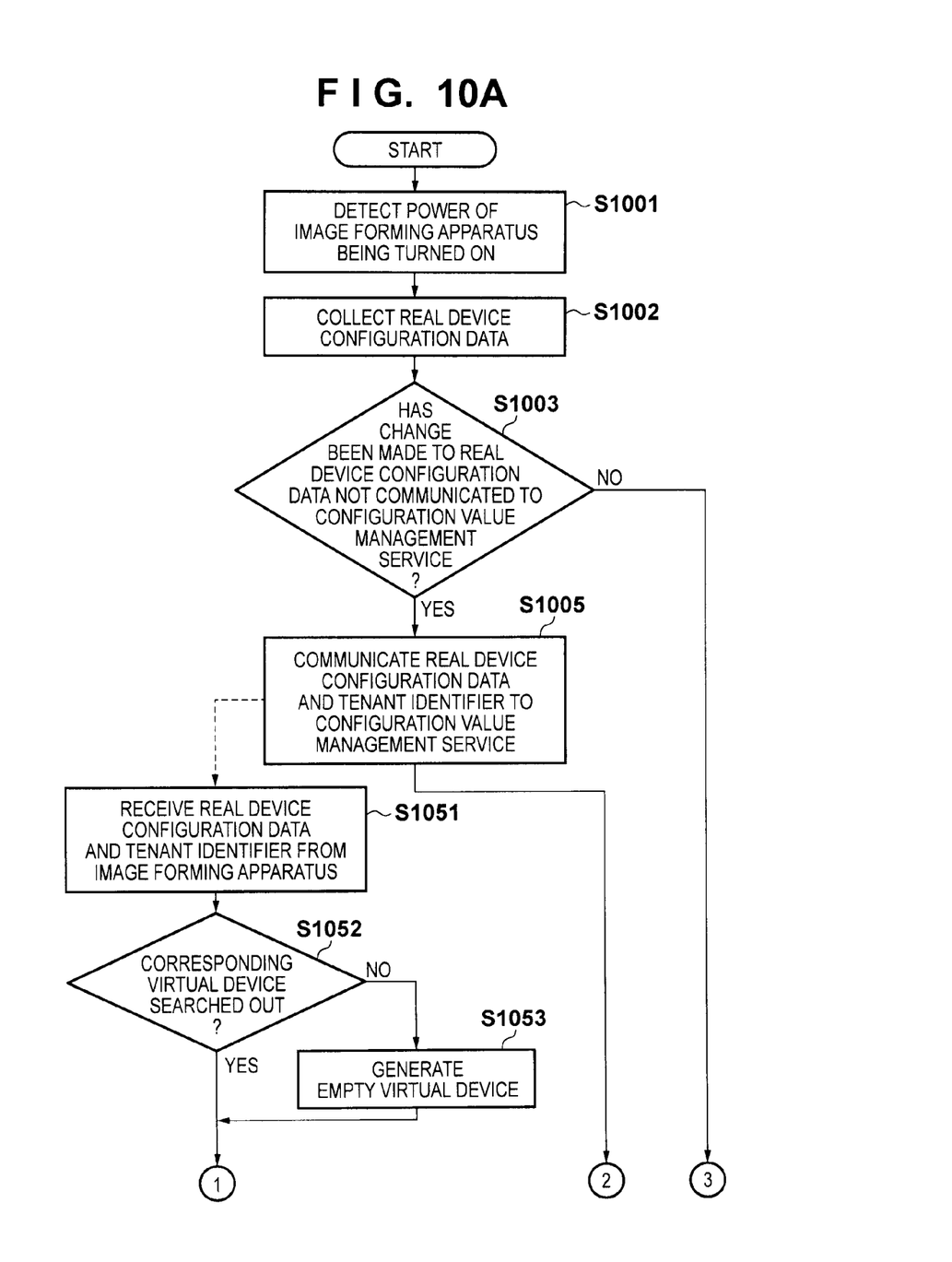
FIG. 10A and FIG. 10B are flowcharts illustrating a process for obtaining virtual config data.
Figure 10B:
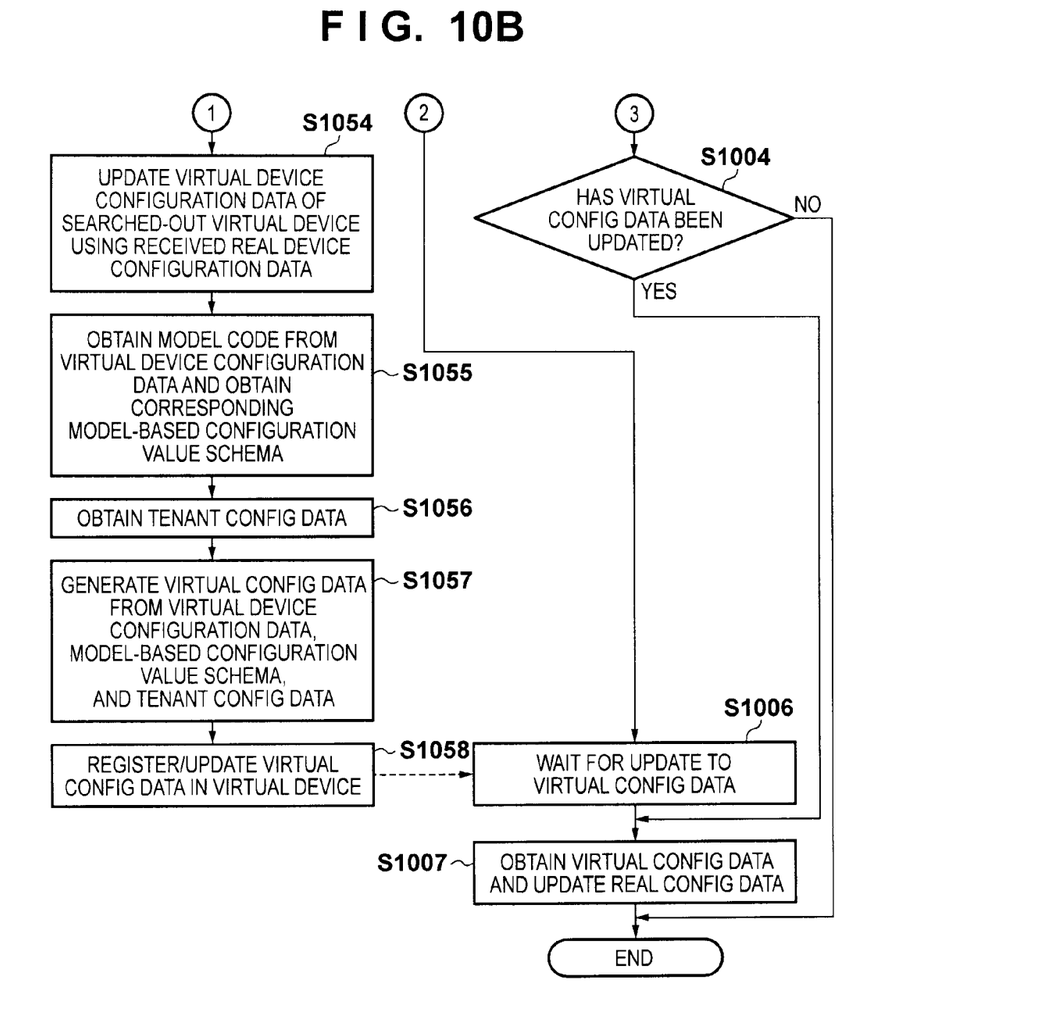

FIG. 10A and FIG. 10B are flowcharts illustrating a process for obtaining the virtual config data from the image forming apparatus. S1001 through S1008 are steps carried out by the image forming apparatus. The respective units that execute these steps are stored in the non-volatile memory 212, the volatile memory 213, or the auxiliary storage unit 214, and are executed by the CPU 211.

S1051 through S1058 are steps executed by the server computer group 105. The respective units that execute these steps are stored in the non-volatile memory 252, the volatile memory 253, or the auxiliary storage unit 254, and are executed by the CPU 251.

In S1001, the real device configuration data notification unit 306 detects that the image forming apparatus has been turned on. In S1002, the real device configuration data collection unit 304 collects the device configuration data. In S1003, the real device configuration data notification unit 306 determines whether or not there has been a change made to the real device configuration data of which the configuration value management service 310 has not yet been notified, using the real device configuration data collected in S1002. In the case where there has been a change, S1005 is executed. In the case where there has not been a change, S1004 is executed.

In S1004, the virtual config data receiving unit 303 determines whether or not the device has obtained the latest virtual config data. The virtual config data receiving unit 303 makes this determination by calling the virtual config data update confirmation unit 322. In S1005, the real device configuration data notification unit 306 communicates the real device configuration data and the tenant identifier to the configuration value management service 310. The configuration value management service 310 detects these items and carries out processing in S1051. Details will be given later.

In S1006, the virtual config data receiving unit 303 waits to execute processing until the virtual config data has finished being updated. In S1007, the virtual config data receiving unit 303 receives the virtual config data from the configuration value management service 310. Furthermore, the real config data updating unit 302 updates the received virtual config data as the real config data. The real config data is stored by the real config data holding unit 301.

In S1051, the real device configuration data receiving unit 318 receives the communicated real device configuration data and tenant identifier from the image forming apparatus. In S1052, the virtual device configuration data updating unit 319 searches out a virtual device that matches the real device configuration data and the tenant identifier received in S1051. The virtual device is searched out from among the virtual devices held by the virtual device holding unit 311. There are cases where a virtual device cannot be searched out, such as in situations where it is the first instance of communication between the image forming apparatus and the configuration value management service 310. In the case where a matching virtual device has been searched out, S1054 is executed. In the case where a matching virtual device could not be searched out, S1053 is executed.

In S1053, the virtual device configuration data updating unit 319 generates an empty virtual device. In S1054, the virtual device configuration data updating unit 319 updates the virtual device configuration data of the virtual device searched out in S1052 or generated in S1053. The content of the real device configuration data received in S1051 becomes the new virtual device configuration data.

In S1055, the virtual config data generation unit 316 obtains the model code from the updated virtual device configuration data. Furthermore, the model-based configuration value schema that corresponds to the model code is obtained from the configuration value schema holding unit 312. In S1056, the virtual config data generation unit 316 obtains the tenant config data. Here, the tenant config data that matches the tenant identifier is searched out from the tenant config data held by the tenant config data holding unit 314.

In S1057, the virtual config data generation unit 316 generates the virtual config data. The virtual config data is generated using the virtual device configuration data, the model-based configuration value schema, and the tenant config data. In S1058, the virtual config data updating unit 317 registers the virtual config data generated in S1057 in the corresponding virtual device. This ends the descriptions of the present embodiment.

Next, variations on the embodiment of the present invention will be described. In the network shown in FIG. 1, it is assumed that the configuration value management service 310 is executed by one of the server computers in the server computer group 105, but a different configuration may be employed. For example, the server computer group may be configured of only a single server computer 205. Alternatively, the configuration value management service may be implemented within the user environment 100, the service personnel environment 110, the vendor environment 120 for the image forming apparatuses, or the like.

Figure 1:
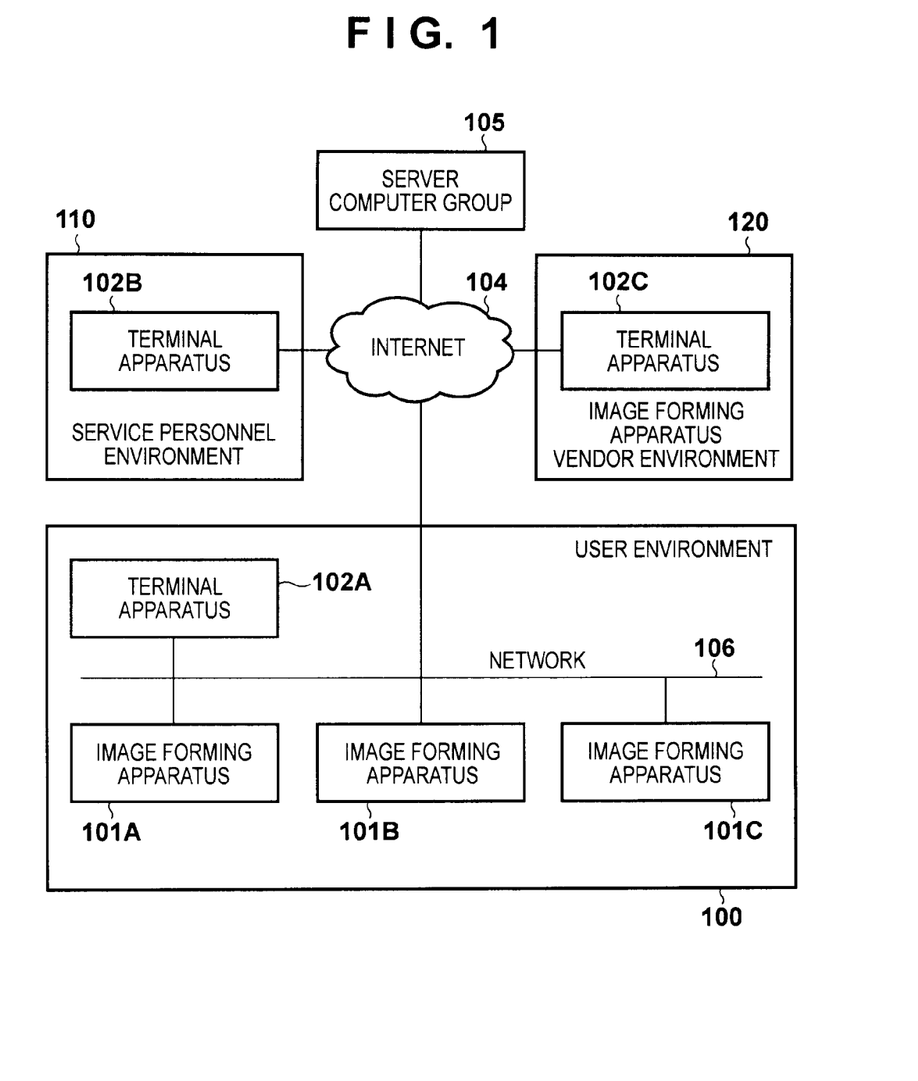
FIG. 1 is a diagram illustrating an example of a network configuration including multiple image forming apparatuses.

In the network diagram illustrated in FIG. 1, it is assumed that the service personnel uses the terminal apparatus 102B within the service personnel environment 110, but a different configuration may be employed. For example, the configuration may be such that the service personnel uses the terminal apparatus 102A within the user environment 100 with the permission of the user.

Figure 2:
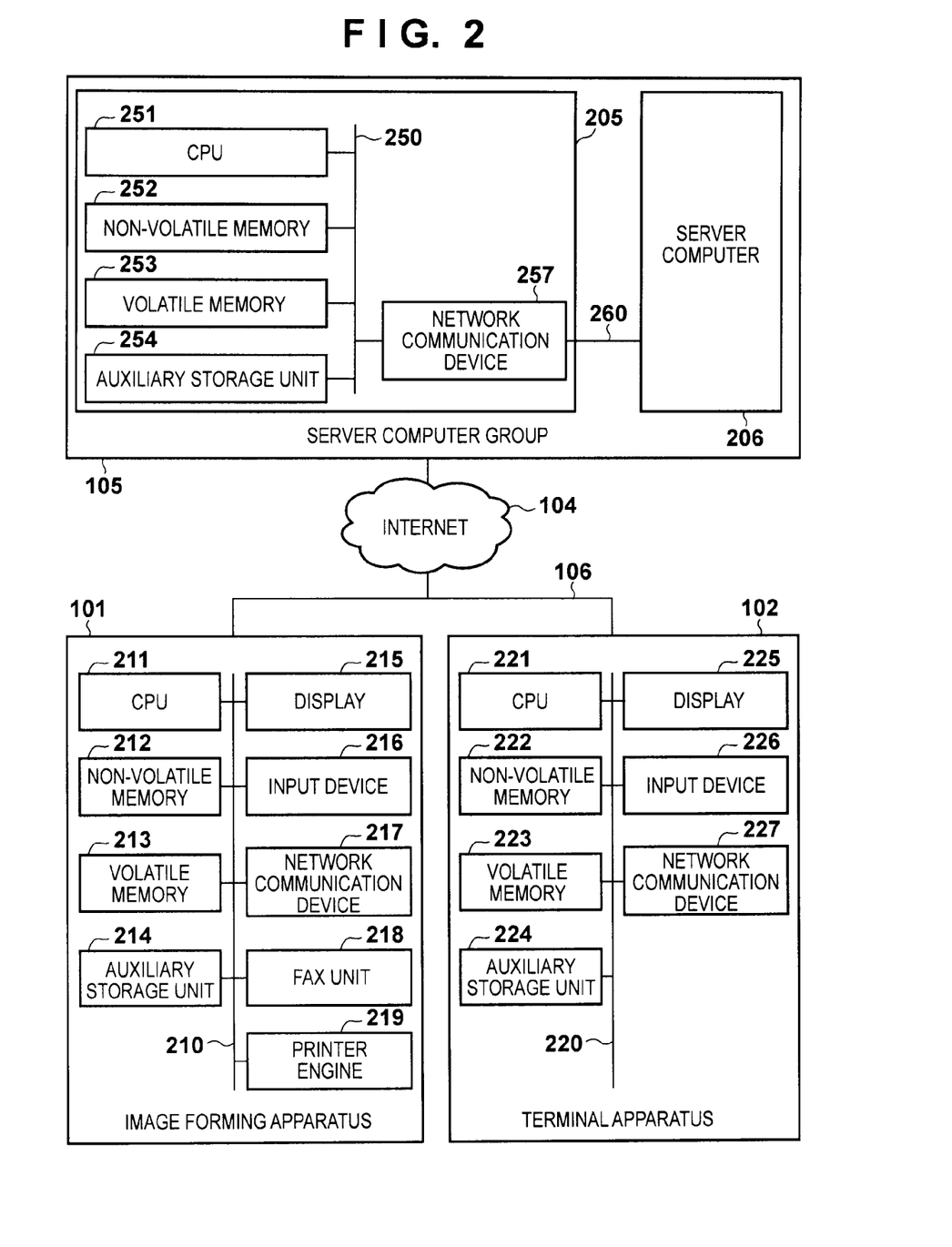
FIG. 2 is a diagram illustrating an example of the hardware configurations of the apparatuses shown in FIG. 1.

The hardware configuration diagram in FIG. 2 assumes that the server computers 205 and 206 communicate over the network 260, but a different configuration may be employed. For example, the communication may be carried out over the Internet 104.

Figure 3:
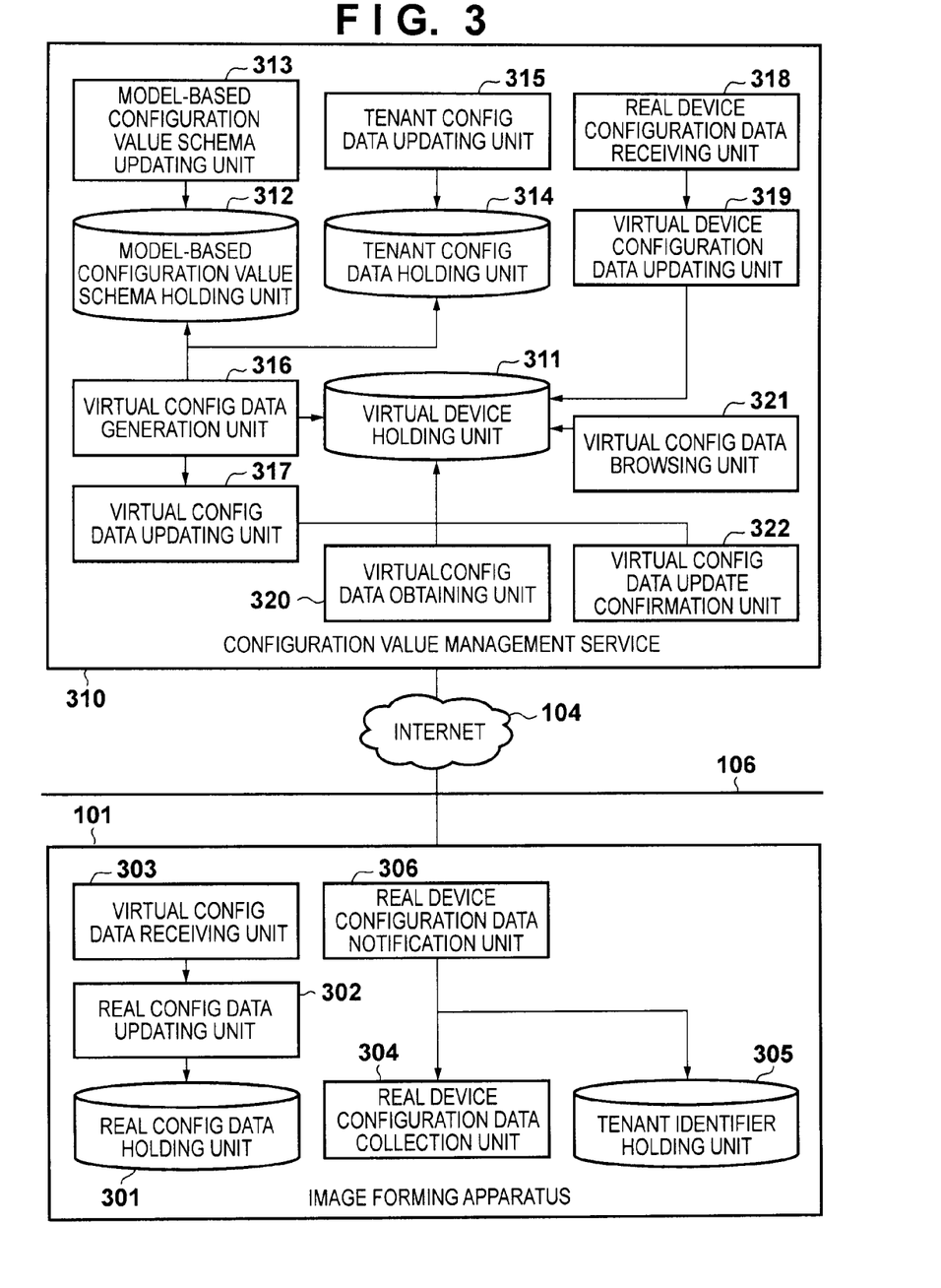
FIG. 3 is a diagram illustrating an example of the software configurations of a configuration value management service and an image forming apparatus.

In the software configuration diagram shown in FIG. 3, the real config data holding unit 301 stores the real config data in the auxiliary storage unit 214, but a different configuration may be employed. For example, the configuration may be such that the data is temporarily stored in the volatile memory 213. In this case, because the real config data is lost when the power is turned off, it is necessary for the virtual config data receiving unit 303 to receive the virtual config data each time the device is turned on. To describe the specific flow of processing involved therewith, it is not necessary for the determination as to whether the virtual config data is updated to be carried out in S1004 of FIG. 10B, and S1007 may always be carried out instead.

In the software configuration diagram shown in FIG. 3, the real device configuration data collection unit 304 collects the real device configuration data each time the image forming apparatus is turned on, but a different configuration may be employed. For example, the configuration may be such that a real device configuration data holding unit is provided, and the real device configuration data holding unit continually stores the real device configuration data in the auxiliary storage unit 214. In this case, it is necessary for the configuration to be such that the real device configuration data held by the real device configuration data holding unit is quickly rewritten in response to a change in the real device configuration data. Accordingly, it is necessary for the real device configuration data collection unit 304 to monitor changes in the real device configuration data and update the changed content in the real device configuration data holding unit when a change to the content has been detected. Furthermore, in such a configuration, the real device configuration data notification unit 306 makes a request for the real device configuration data to the real device configuration data holding unit.

In the software configuration diagram shown in FIG. 3, the tenant identifier holding unit 305 stores the tenant identifier in the auxiliary storage unit 214, but a different configuration may be employed. For example, the configuration may be such that the user inputs the tenant identifier each time using the input device 216. The input may be carried out when the image forming apparatus is started, or may be carried out at a different time. In this case, the tenant identifier is stored in the volatile memory 213.

In the software configuration diagram shown in FIG. 3, the real device configuration data notification unit 306 carries out processing upon detecting that the image forming apparatus has been turned on, but a different configuration may be employed. For example, the configuration may be such that the user instructs the virtual config data to be obtained using the input device 216. In this case, in FIG. 10A, the processes from S1002 and on are executed upon the detection of the instruction to obtain the virtual config data in S1001.

In the software configuration diagram shown in FIG. 3, the virtual device holding unit 311 holds identifiers for identifying the virtual device configuration data and the virtual config data as shown in FIG. 8, but a different configuration may be employed. For example, the configuration may be such that the data itself is held, rather than identifiers.

In the software configuration diagram shown in FIG. 3, the virtual config data generation unit 316 generates the virtual config data from the model-based configuration value schema, the tenant config data, and the virtual device configuration data, but a different configuration may be employed. For example, the configuration may be such that the virtual config data is generated for each model from the model-based configuration value schema and the tenant config data. In this case, the configuration is such that when referring to the real config data, the image forming apparatus carries out the reference in accordance with the device configuration.

As another example, the configuration may be such that the virtual config data is further generated using license data. In this case, the configuration is such that the virtual config data is generated in accordance with the optional functions provided in the image forming apparatus.

OTHER EMBODIMENTS

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-132709, filed Jun. 14, 2011, which is hereby incorporated by reference herein in its entirety.

What is claimed is:

1. A configuration value management apparatus that collectively manages configuration values of multiple image forming apparatuses, the configuration value management apparatus comprising:
a CPU coupled to a memory, wherein the CPU is programmed to provide:
a generating unit that generates virtual configuration values for a specific image forming apparatus using a model-based configuration value schema that defines a configuration value schema for each model of multiple image forming apparatuses, and using device configuration data indicating a configuration of a device in the specific image forming apparatus; and
an applying unit that applies, in a case where a new settings item is present in the virtual configuration values generated by the generating unit, the new settings item to settings items in tenant configuration values.

2. The configuration value management apparatus according to claim 1, wherein the applying unit uses a default value or a value inputted by an administrator as a value of the new settings item when applying the new settings item to the settings items in the tenant configuration values.

3. The configuration value management apparatus according to claim 2, wherein, when the tenant configuration values are linked to a virtual device, or when a new model of an image forming apparatus has been added, the value of the new settings item is input in the virtual configuration values.

4. The configuration value management apparatus according to claim 1, wherein the tenant configuration values are configuration values set in the multiple image forming apparatuses.

5. A management method for a configuration value management apparatus that collectively manages configuration values of multiple image forming apparatuses, the management method comprising steps of:
generating virtual configuration values for a specific image forming apparatus using a model-based configuration value schema that defines a configuration value schema for each model of multiple image forming apparatuses, and using device configuration data indicating a configuration of a device in the specific image forming apparatus; and
applying, in a case where a new settings item is present in the virtual configuration values generated in the generating step, the new settings item to settings items in tenant configuration values.

6. The management method according to claim 5, wherein, in the applying step, a default value or a value inputted by an administrator is used as a value of the new settings item when applying the new settings item to the settings items in the tenant configuration values.

7. The management method according to claim 6, wherein, when the tenant configuration values are linked to a virtual device, or when a new model of an image forming apparatus has been added, the value of the new settings item is input in the virtual configuration values.

8. The management method according to claim 5, wherein the tenant configuration values are configuration values set in the multiple image forming apparatuses.

9. A non-transitory computer-readable recording medium storing a program that when executed causes a computer to perform a management method for a configuration value management apparatus, the management method comprising steps of:
generating virtual configuration values for a specific image forming apparatus using a model-based configuration value schema that defines a configuration value schema for each model of multiple image forming apparatuses, and using device configuration data indicating a configuration of a device in the specific image forming apparatus; and
applying, in a case where a new settings item is present in the virtual configuration values generated in the generating step, the new settings item to settings items in tenant configuration values.

* * * * *